United States Patent
Nguyen et al.

(10) Patent No.: US 12,518,403 B2
(45) Date of Patent: Jan. 6, 2026

(54) DEEP LEARNING METHOD FOR MULTIPLE OBJECT TRACKING FROM VIDEO

(71) Applicant: VIETTEL GROUP, Ha Noi (VN)

(72) Inventors: Hong Dang Nguyen, Nam Dinh Province (VN); Thi Hanh Vu, Hai Phong (VN); Manh Quy Nguyen, Ha Noi (VN)

(73) Assignee: VIETTEL GROUP, Ha Noi (VN)

(*) Notice: Subject to any disclaimer, the term of this patent is extended or adjusted under 35 U.S.C. 154(b) by 294 days.

(21) Appl. No.: 18/480,127

(22) Filed: Oct. 3, 2023

(65) Prior Publication Data
US 2024/0144489 A1    May 2, 2024

(30) Foreign Application Priority Data
Nov. 2, 2022  (VN) .............................. 1-2022-07172

(51) Int. Cl.
*G06T 7/246*     (2017.01)
*G06V 10/82*    (2022.01)
*G06V 20/40*    (2022.01)

(52) U.S. Cl.
CPC .............. *G06T 7/248* (2017.01); *G06V 10/82* (2022.01); *G06V 20/46* (2022.01); *G06T 2207/10016* (2013.01)

(58) Field of Classification Search
None
See application file for complete search history.

(56) References Cited

U.S. PATENT DOCUMENTS

| | | | |
|---|---|---|---|
| 2020/0065976 A1* | 2/2020 | Han | G06V 10/82 |
| 2023/0206067 A1* | 6/2023 | Wang | G06N 3/0455 |
| | | | 382/155 |
| 2023/0316749 A1* | 10/2023 | Sanchez Lozano | G06V 10/82 |
| | | | 382/159 |
| 2025/0078286 A1* | 3/2025 | Yao | G06T 7/80 |
| 2025/0095349 A1* | 3/2025 | Dutson | G06V 10/86 |

OTHER PUBLICATIONS

Transformer Meets Remote Sensing Video Detection and Tracking: A Comprehensive Survey. Jiao et al. (Year: 2023).*
Transformers in Action Recognition: A Review on Temporal Modeling. Shabaninia et al. (Year: 2022).*

\* cited by examiner

*Primary Examiner* — Delomia L Gilliard
(74) *Attorney, Agent, or Firm* — patenttm.us (57) ABSTRACT

A method for multi-object tracking from video. The method includes the following steps: (1) Capturing frames from the streaming source and preprocess the data; (2) Extract video features with three choices: a 3D-CNN backbone followed by a Transformer Encoder, a Video Transformer Encoder, a 2D-CNN Encoder with a stack of frames as input followed by a Transformer Encoder; (3) Multi-object tracking using a new end-to-end multi-task deep learning model named JDAT (Joint Detection Association Transformer), then postprocessing and updating tracking state with Temporal Aggregation Module (TAM). The deep learning models in step 2 and step 3 are trained simultaneously end-to-end with a loss function that is accumulated over multiple timesteps (Collective Average Loss—CAL). Also, the model can be pretrained with weakly labeled image dataset in a self-supervised learning manner first, then finetuned on supervised video datasets with full tracking labels.

20 Claims, 6 Drawing Sheets

DEEP LEARNING METHOD FOR MULTIPLE OBJECT TRACKING FROM VIDEO

TECHNICAL FIELD

Embodiments generally propose a method for Multiple Object Tracking (MOT) problem on surveillance camera footage. The method applies Deep Learning techniques to detect and track multiple objects simultaneously in a video or camera stream. This is a core technology used in most of the current intelligent video analytics solutions, applied to various problems such as object tracking, object searching, intelligent traffic, intelligent video analytic, and self-driving cars.

BACKGROUND

Multiple Object Tracking (MOT) is the task of automatically detecting objects of interest in a video and associating each object with a unique identifier (ID). The human vision system has the ability to detect and track objects with incredible accuracy. As such, an automatic multiple object tracking solution with high accuracy has long been considered a prerequisite for a smart computer vision system. MOT is considered a core component in most applications related to cameras in general and surveillance cameras in particular, such as:
- MOT module combined with rules (either handcrafted or learned) to automatically analyze and detect certain behaviors of the tracked subjects (e.g., person, vehicle), count the number of objects, etc.
- MOT module acts as a preprocessing module to improve the accuracy of subsequent analysis steps (e.g., identifying the instance-level actions of each detected object).

In practice, there could be many factors which can affect the accuracy of an MOT system, such as the small object size, occlusion, diverse camera angles, large camera motion, highly similar object appearance (e.g., wearing same clothes), unpredictable movement speed/trajectory, and various types of noise, etc. Therefore, automatic multiple object tracking becomes a complex problem that requires modeling many factors to achieve such a high accuracy. Typical factors are: (1) motion features are useful information for short-term association between adjacent frames (2) appearance features are important information for long-term association, e.g. when strong occlusion happen for a long period, or an object goes out of the frame and then reappears later.

Current methods typically contain multiple sub-modules, then each sub-module is modeled and optimized independently. The most common approach is composed of three steps/modules as follows: (1) object detection module (2) object re-identification module (3) object association module. Each module can be built and optimized using independent loss functions, independent data, and independent evaluation strategy. Specifically, in step 1, the object detection module typically utilize a high accuracy object detection model, measured and evaluated by the mAP (mean Average Precision) metric. In step 2, the object re-identification module contains a feature extraction model, in which the input is the cropped image patch containing each object (bounding box from step 1). This model is typically trained with metric learning approach, using loss functions such as Contrastive loss, Triplet loss, Circle loss, etc., in order to maximize the similarity (e.g., Euclidean distance, Cosine similarity) between observations of the same instance, and minimize similarity between observations of different instances. The output of the first two steps are fed to the object association module in step 3, which is typically contain a set of handcrafted logics, integrating algorithms such as SORT (Simple Online and Realtime Tracking), DeepSORT or cascade matching mechanism to associate and update tracking state across timesteps.

The evaluation of each sub-module becomes complicated and difficult to control due to accumulated error across stages or cross-interaction, i.e., independently improving a module could negatively affect other modules, thus reduce the overall accuracy. The object detection module typically takes input as a single static frame, while temporal and motion feature between consecutive frames contains a lot of useful information but has not been exploited. The re-identification module may not work well in cases of occlusion or motion blur and cause ID switch issue in case the appearances of two objects are very similar. In addition, the extraction of local features from the object's cropped image patch has not considered the global context, such as the relative position and interaction between objects. The object association module is constructed based on the Kalman filter, which is a handcrafted motion model, work quite well under the assumption of high frame rate (FPS), linear motion trajectory and constant speed. In contrast, such methods are less effective in more complex scenarios such as low FPS, complex motion or nonlinear object trajectory.

We propose a method to solve these above problems, do not following the traditional approach of decomposing to multiple independent components/modules, instead build an end-to-end deep learning model to solve the multiple object tracking problem with high accuracy.

BRIEF DESCRIPTION OF METHOD

Embodiments propose a new method to solve the problem of multi-object tracking from video footage, which acts as a core component in almost intelligent video analytics applications. Specifically, the problem requires detecting all object classes of interest (e.g., people, vehicles, etc.) and assigning an identifier (ID) to each object across a sequence of frames captured from a camera.

The method comprises the following steps:
- Step 1: Stream capturing and data pre-processing: this step capture consecutive frames from the streaming source (camera/video), samples the required frames (e.g. drop some unnecessary frames), preprocesses (standardize) every stream to the same frame rate, resolution then put the pre-processed frames to a queue as input to the next step.
- Step 2: Video feature extraction: this step is performed based on a set of deep learning models which can effectively extract the spatial-temporal features. Specifically, we proposed three choices of model: (1) a 3D Convolutional Neural Network (3D-CNN) followed by a Transformer Encoder (2) a Video Transformer model or (3) a 2D Convolutional Neural Network (2D-CNN) with stacked frames along channel dimension as input, followed by a Transformer Encoder.
- Step 3: Multi-object tracking and post-processing: This step is performed based on three substeps: (3.1) Object detection and association using a multi-tasks end-to-end deep learning model, named JDAT (Join Detection Association Transformer). This model consists of three important components: a Transformer Decoder model, a Feature Relation Transformer model and a Differentiable Matching Layer. (3.2) post-processing and tracking state aggregation (3.3) Update of tracking state using a Temporal Aggregation Module (TAM).

The deep learning models in steps 2 and 3 are jointly trained end-to-end with a Collective Average Loss (CAL) function that is accumulated over multiple frames in a sequence.

DETAILED DESCRIPTION

The proposed method is described in detail below with reference to the drawings, which are intended to illustrate the embodiments and are not intended to limit the scope claims.

The description also refers to a number of existing concepts or formulas used in the field of Computer Science and Artificial Intelligence. However, some of the formulas are self-included to indicate how to apply those in the embodiments.

Figure 1:
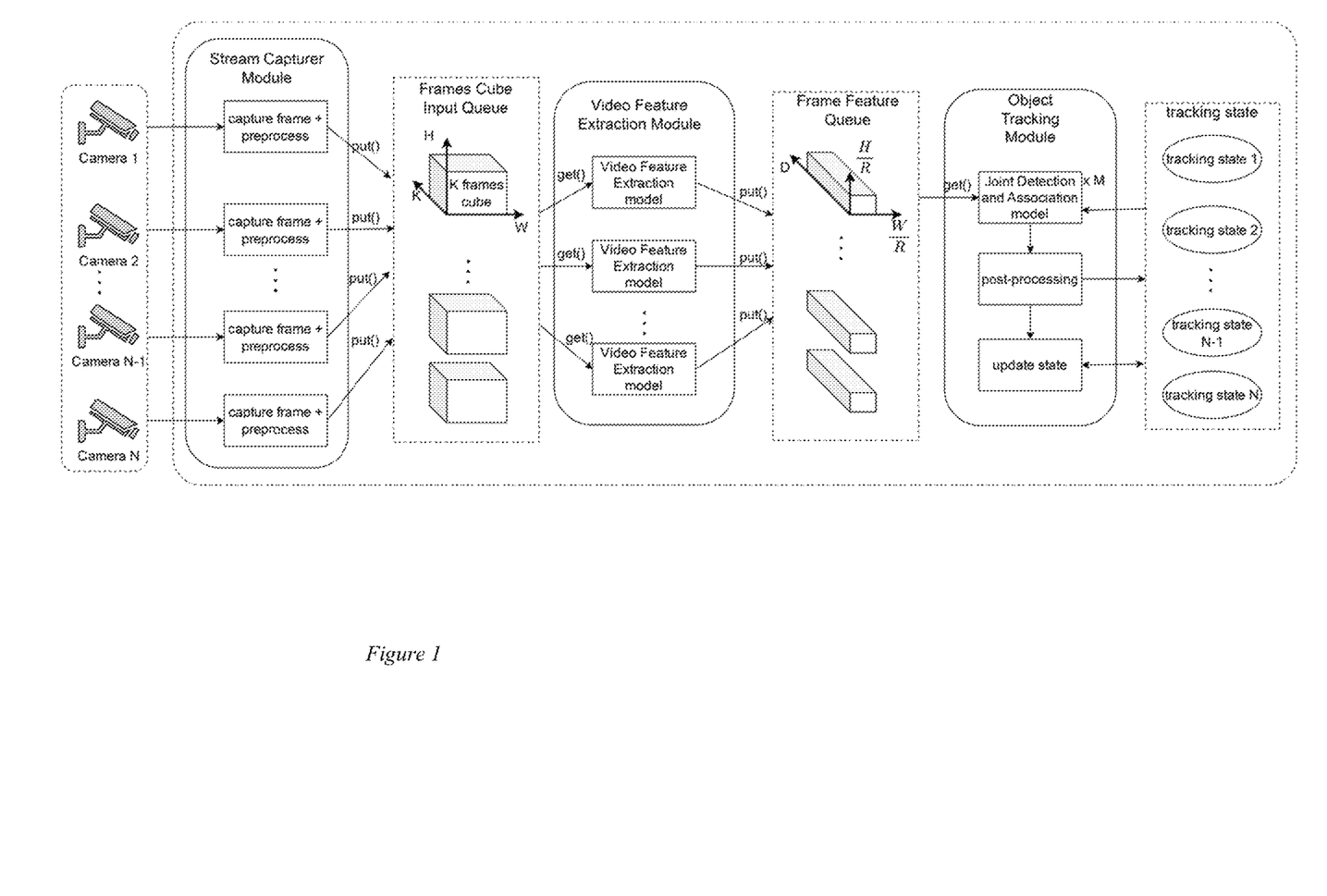
FIG. 1 is a schematic diagram that describes the general logical components and operation of the proposed multi-object tracking system on streaming video.

FIG. 1 illustrates an overview of the logical components and pipeline of the proposed multi-object tracking system. The physical/hardware components of the system in practice includes: (1) a set of streaming sources (camera, video, etc.) and (2) a computing hardware (either an edge device or central server) which is usually equipped with computing accelerators, e.g. GPU (Graphics Processing Unit) or TPU (Tensor Processing Unit). Logical components are deployed as executable programs on the hardware, the sub-components are implemented as processes or threads, executing a specific task of the overall pipeline.

In details, we proposed a method including the following steps:

Step 1: Capturing Frames from the Streaming Source and Preprocess the Data;

The Stream Capturer module receives consecutive frames from the streaming source, samples the required frames, preprocesses them, then puts them into Frames Cube Input Queue. The preprocessing step standardizes frames from every stream to the same frame rate and resolution. Given a sequence of consecutive frames obtained from a camera, the method only performs tracking on a subset of frames (frames of interest), in order to reduce the unnecessary computational cost and redundant information since adjacent frames show very small differences, especially when the original frame rate is high. For example, if the camera stream has a FPS=30, sampling one frame every three consecutive frames, a frames stream with FPS=10 is obtained. Formally, this queue contains a set of frames cubes, each cube can be represented by a matrix $I \in R^{K \times H \times W \times C}$ (where H, W are the height and width of the frame respectively; K is the number of frames per cube; C is the number channels, usually C=3 considering RGB images).

Step 2: Video Features Extraction

Each cube of frames mentioned in step 1 will be fed as input to the video feature extraction module in step 2. This module can include multiple instances of deep learning models that are able to extract both spatial and temporal features. These model instances share the same architecture, but serve in parallel and can be distributed across different execution hardware units to increase throughput and reduce latency. The output of this module is a matrix of extracted feature for each target frame contained in each input cupe, represented by a matrix $F \in$ $$R^{\frac{H}{R} \times \frac{W}{R} \times D}$$

(D is the number of feature channels) which is then fed into the Frame Feature Queue as input in step 3.

Existing methods typically extract the feature of a target frame utilizing 2D-CNN deep learning models with a single static frame as input, represented by a matrix $I \in R^{H \times W \times C}$. These models are capable of extracting spatial feature, but they neglect temporal feature due to the limitation of using just a single static frame as input. In complex scenarios such as small object sizes, objects with similar appearance (e.g., wearing uniforms) or large occlusion; temporal feature (especially motion feature) are very important for object detection and object discrimination. We propose a different approach to extract feature of a target frame, which combine information from nearby frames (both before or after) to enhance the extracted feature of that target frame. The feature extraction deep learning module takes a cube of adjacent frames as input, with capable of extracting feature in both space and time (spatial-temporal feature). Specifically, we propose three choices for deep learning feature extractor: (1) a 3D-CNN backbone followed by a Transformer Encoder (2) a Video Transformer Encoder and (3) a 2D-CNN encoder with stack of frames as input followed by a Transformer Encoder.

Figure 2:
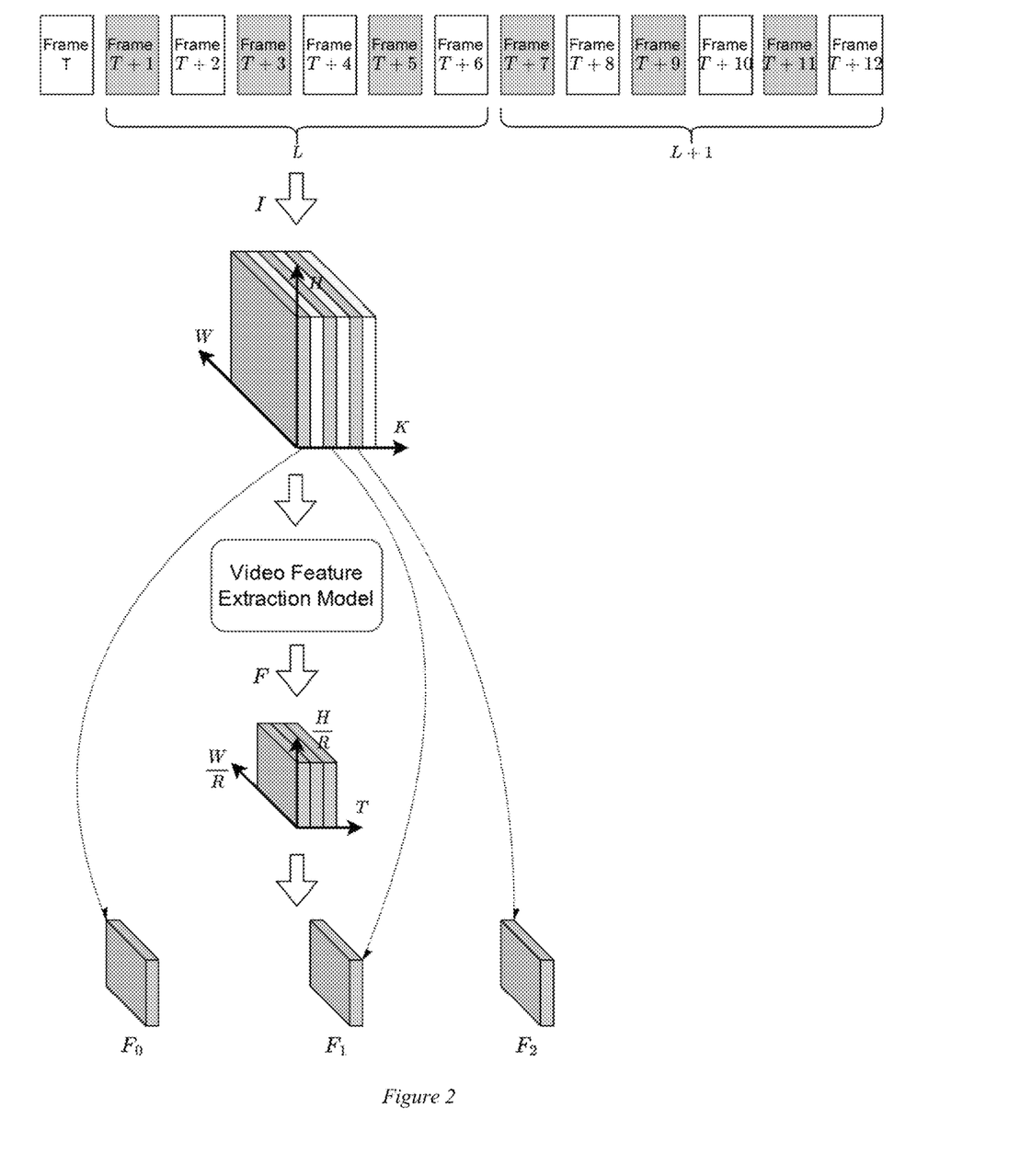
FIG. 2 visualizes the frame sampling strategy as input to the video feature extraction module, allow extracting features of T consecutive frames simultaneously, using either a 3D-CNN or a Video Transformer model.

Reference to FIG. 2, for the two model choices of 3D-CNN or Video Transformer, the deep learning model takes input as a sequence of K frames sampled around a sequence of T frames of interest (K≥T, typically K is a multiplier of T), represented by a matrix $I \in R^{K \times H \times W \times C}$. The output of the model is the extracted feature of T frames of interest, represented by a matrix $F \in$ $$R^{T \times \frac{H}{R} \times \frac{W}{R} \times D}$$

(typically, R=32), in which the matrix $F_i \in$ $$R^{\frac{H}{R} \times \frac{W}{R} \times D}$$

is considered as the feature of the i th frame. Note that this models choice extract features of T frames in a single inference step (parallelism), instead of T inference steps as traditional methods using 2D-CNN over each frame.

Figure 3:
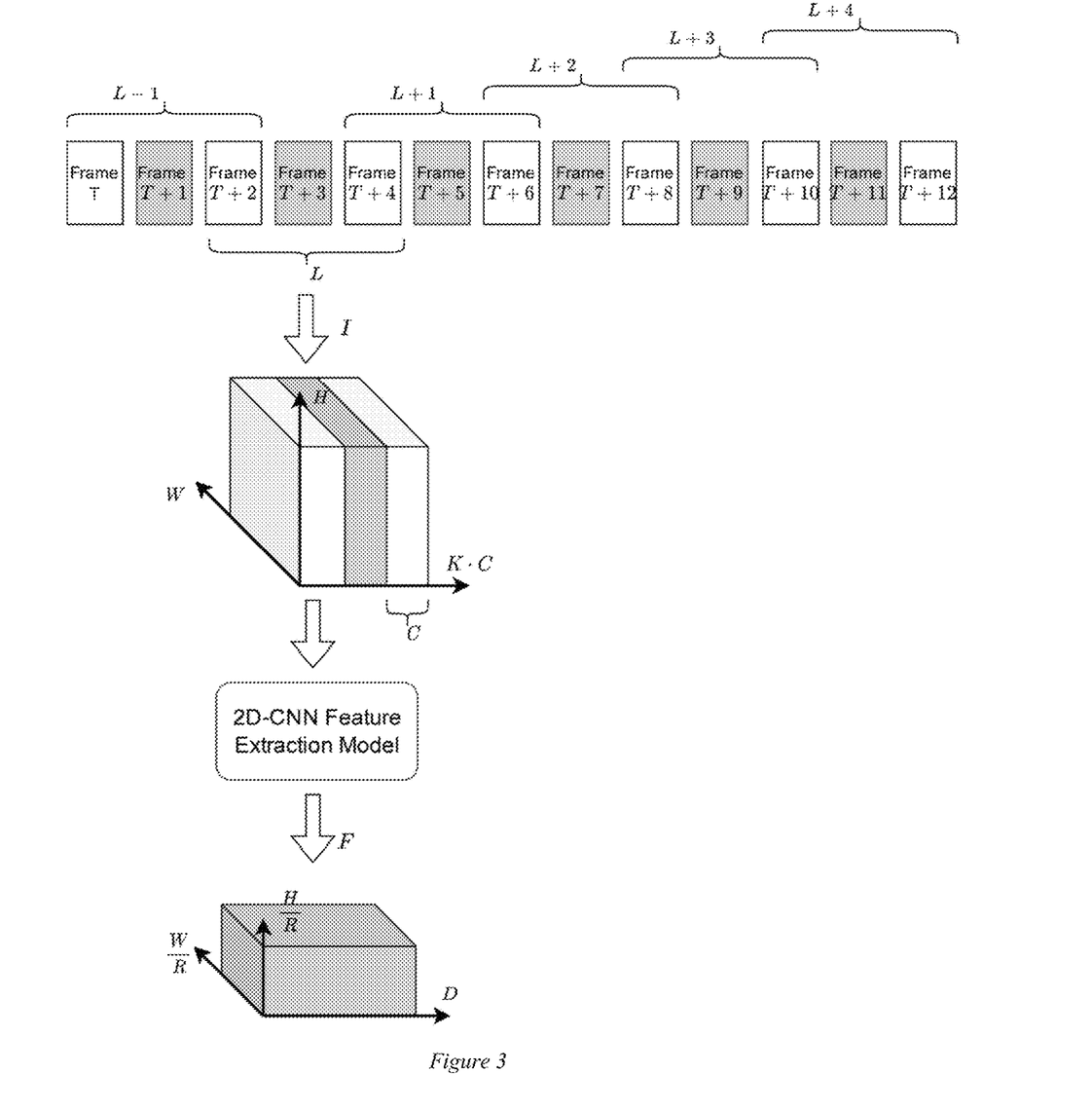
FIG. 3 visualizes the frame sampling strategy and nearby frames stacking mechanism as input to a 2D-CNN.

Reference to FIG. 3, for the choice of using 2D-CNN variants, we propose a minimal change to extract feature of a single frame Y of interest. Specifically, we sample K frames around that frame Y of interest, stack the K frames along the channel dimension, obtaining a input matrix $I \in R^{H \times W \times (C \times K)}$. This matrix becomes the input for common 2D-CNN models such as Resnet, MobileNet, etc., for feature extraction. The output is a feature matrix $F \in$ $$R^{\frac{H}{R} \times \frac{W}{R} \times D}$$

considered as the feature of the frame Y. These feature matrix is then fed as input to a Transformer Encoder model to be enhanced with the global context information. This additional Transformer Encoder shows its effective when K is small (e.g. K≤3) without any change to the 2D-CNN architecture, also gaining benefit from various pre-trained models on large datasets. We only select and extract feature of the frames of interest, and ensures that features of all frames of interest are extracted for the next processing step.

3D-CNNs have been applied to video understanding tasks and have achieved high performance in terms of both accuracy and speed, e.g., TSM (Temporal Shift Module), SlowFast, X3D, MoviNet, etc. These models are built on 3D convolution layers or separated 3D convolution layers ((2+1)D-CNNs). In addition, the architecture design of 3D-CNNs typically does not include pooling layers (pooling layers are usually used after the convolution layer to aggregate local output activations and reduce the resolution of feature map) along the temporal dimension, i.e., the temporal dimension is always prioritized to be retained until the last layer before the global pooling layer, with assumption that keeping the temporal dimension helps to retain necessary temporal features. This common design is suitable for the purpose of extracting features of T nearby frames parallelly as proposed, so minimal modification to architecture needed for 3D-CNNs, and thus benefit from pre-training/transfer learning on large datasets. CNN models can effectively extract hierarchical features step by step, from local to global, but usually the effective receptive field is much smaller compared to Transformer model with global receptive field. We propose to use a Transformer encoder model immediately after the 3D-CNN to increase the ability to extract global features, resolve the weaknesses of CNN models thus improve accuracy in later step. The proposed Transformer part contain N effective linear self-attention layers (e.g., 2≤N≤8), which slightly increases the computational cost but significantly improves the ability to extract global, context-aware interaction thanks to the Transformer's attention mechanism.

Video Transformer is another choice for feature extraction model in this step. Transformer models have increasingly demonstrated their modeling capacity, efficiency and generalize ability in many computer vision tasks. However, there are some trade-off such that higher computation cost, large number of parameters or lack of inductive bias. Recently, new lightweight/efficient architectures such as Swin Transformer, MVIT (Multi-scale Vision Transformer), etc., significantly enlarge the application of Transformer for video understanding task and become feasible even on edge devices. These Video Transformer architectures can extract both hierarchical features and global features. Swin Transformer introduces a mechanism to combine local attention with global attention, which significantly reduce the computational cost while improve accuracy. MVIT introduces QKV (queries, keys, values) pooling, decreasing the sequence length step-by-step and increasing the feature channel size across stages. Both of the above architectures adopt CNN design principles, thus archive both high accuracy and efficiency in many tasks including image classification, video analysis, object detection, etc. and continually become standard backbone for extracting spatial-temporal features in video. Similarly to 3D-CNN, on Video Transformer models, the temporal dimension is retained and therefore these model architectures can be directly utilized for feature extraction with minimal changes.

Step 3: Multi-Object Tracking, Post-Processing and Updating Tracking State;

The object tracking module performs object detection and association based on the input feature of the frame of interest, combined with the current tracking state. This step includes three substeps as follows:

Step 3.1: Object Detection and Association Using a Multi-Task End-to-End Deep Learning Model, Named JDAT (Joint Detection Association Transformer).

Figure 4:
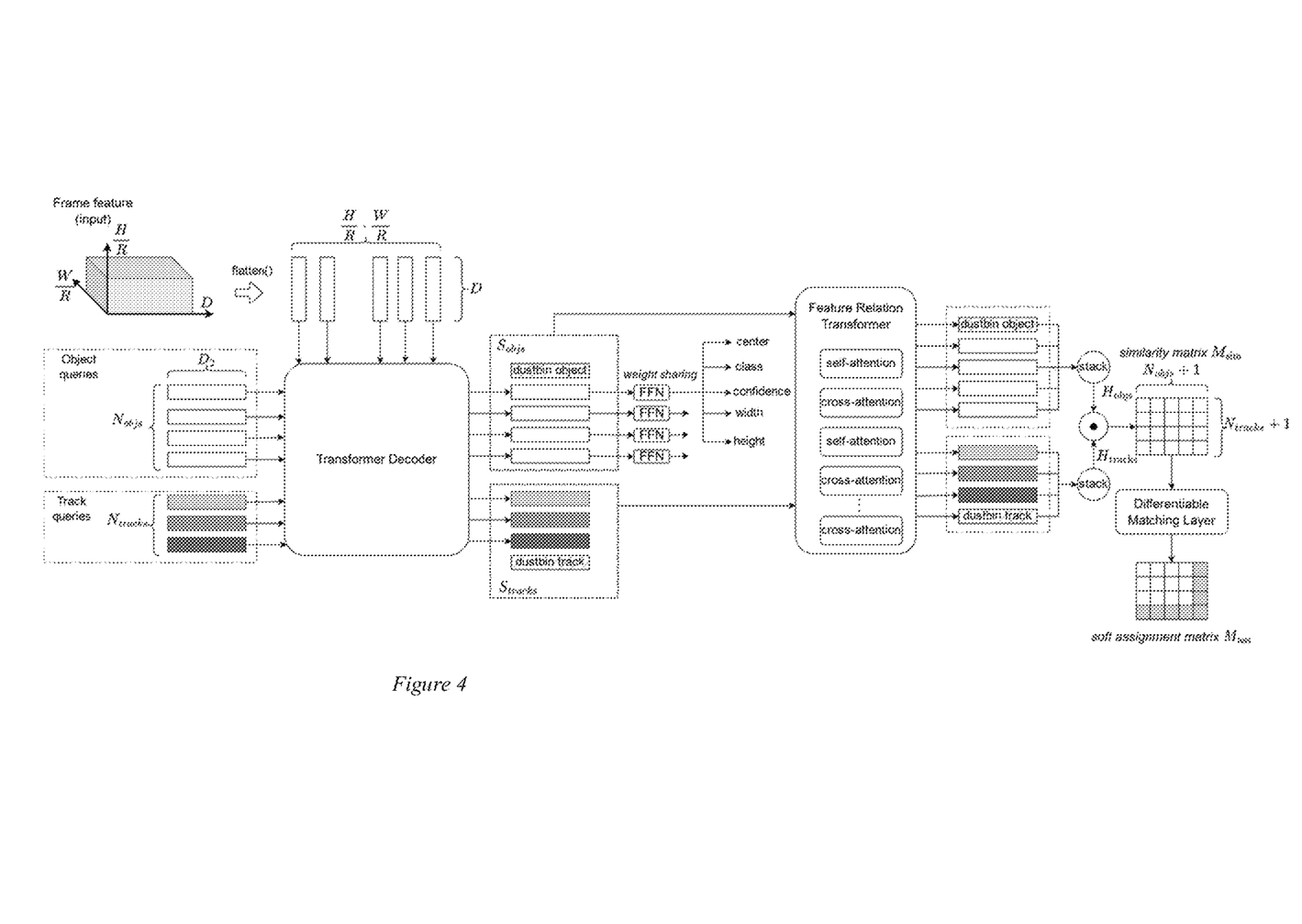
FIG. 4 describes the proposed end-to-end deep learning model for multiple object tracking, named JDAT (Join Detection Association Transformer).

The deep learning model performs object detection and associates newly detected objects with a list of keeping tracks (track is a term of tracking state corresponding to a specific object instance, each track can be represented by that instance's properties such as: identifier, location, velocity, size, recognition features, etc.) and allows end-to-end training. This model is composed of three key components: (1) a Transformer Decoder model, (2) a Feature Relation Transformer and (3) a Differentiable Matching Layer. FIG. 4 describes the architecture and workflow of the JDAT model.

First, the Transformer Decoder model is built based on the idea of DETR (Detection Transformer), an approach for object detection with the Transformer architecture. DETR's output is set-based, use parallel decoding mechanism instead of autoregressive decoding. The set of input queries is constructed as a union of two sets: (1) the object queries set inherits the idea from DETR, consisting of $N_{objs}$ vectors (typically, $N_{objs}$=100) and (2) the track queries set consists of $N_{tracks}$ vectors, each vector representing a track that is considered to be active at the current time. Denote $query_t^i$ is the i th query at t th timestep, is modeled as the sum of two vectors $query_t^i = feature_t^i + position_t^i$, where $position_t^i$ acts as positional encoding in Transformer model and is added to the query vector at start of each attention layer. All these vectors all have size $D_2$, so the queries set can be represented by a matrix $Q \in R^{(N_{objs}+N_{tracks}) \times D_2}$. We propose to use Deformable DETR as the Transformer Decoder architecture. Note that $N_{objs}$ is set to a constant, but $N_{tracks}$ changes dynamically and depends on the previous timestep's tracking state. Inherited from DETR, the object query vectors are learnable embeddings. The Transformer Decoder model are built on self-attention and cross-attention layers in where the queries self-interact with each other and cross-interact with the extracted frame feature map from step 1. This design allows object queries can directly interact with track queries thus improve object detection accuracy in occlusion situations. Intuitively, tracking state in the previous timestep and current timestep contains useful information for object detection (referring track-to-detect approach), compared to other methods that mostly do not considering tracking state to improve object detection accuracy.

The output of the Transformer Decoder model is a set of $N_{objs}+N_{tracks}$ hidden states with size $D_2$ corresponding to each input query, named the query hidden states. In which, the first $N_{objs}$ hidden states correspond to the $N_{objs}$ object queries. Each vector in these $N_{objs}$ hidden states is then passed through a feed-forward neural network (FFN) to predict object's properties including center coordinate, width, height, class (e.g., person, bicycle, motorcycle, etc.), and confidence. The pipeline for detecting objects is identical to original DETR model. Finally, $N_{objs}$ objects are filtered based on the confidence score to distinguish real objects from background. We use simple rule that real objects will have a high confidence that is greater than a threshold $\theta_{det}$, where objects with confidence score less than $\theta_{det}$ are considered to be background and be removed. The Transformer Decoder model is trained in a similar way to the Deformable DETR model in supervised manner. This model inherits the advantages of DETR such as: no need for post-processing algorithms such as NMS (Non-maximum Suppression) to filter out duplicated objects, effective learned global context reasoning thanks to the Transformer architecture, etc. At inference time, removing the NMS step significantly reduces the latency for the post-processing step. Another advantage of this design is that object queries can directly interact with track queries through the attention mechanism, thus enrich both kind of feature representations.

Second, to perform object-track association, one need a good and reliable feature embedding of each object and track. We propose to use a Feature Relation Transformer model based on self-attention and cross-attention layers. This model takes two sets of embedding vectors as input: (1) the set of hidden states of object queries $S_{objs}$ and (2) the set of track queries's embeddings $S_{tracks}$ from the previous timestep. The target output is a soft assignment matrix where each row represents a track query, each column represents an object query, and the element at i th row, j th column is a probability score if the i th track i is associate to j th object. Note that a row may not be associated with any columns (when a track corresponding to that row disappears), or a column may not be associated with any rows (when an object represented by that column appears for the first time). To address this issue, we propose to use the "dustbin" technique, which is a widely used technique in graph neural network literature. Specifically, this technique involves adding a dustbin object (virtual object) to the $S_{objs}$ set and a dustbin track (virtual track) to the $S_{tracks}$ set. Each dustbin object is represented by a learnable vector of size $D_2$. Therefore, $|S_{objs}|=N_{objs}+1$ or $|S_{tracks}|=N_{tracks}+1$. Next step, $S_{objs}$ and $S_{tracks}$ are passed through the Feature Relation-Transformer model, which includes self-attention layers to model interactions within each sets, and cross-attention layers to model interactions across the two sets. The output hidden states of the Transformer model corresponding to the two sets are represented by two matrices $H_{objs} \in R^{(N_{objs}+1) \times D_2}$ and $H_{tracks} \in R^{(N_{tracks}+1) \times D_2}$. The dot product of these two matrices represents the feature similarity between each pair of track query and object query, denotes as a matrix $M_{sim} = H_{tracks} H_{objs}^T \in R^{(N_{tracks}+1) \times (N_{objs}+1)}$. Each row in $M_{sim}$ corresponds to a track, and each column corresponds to an object. Note that this Feature Relation Transformer model is optional, i.e. it can be included or ignored in the overall JDAT model. The Feature Relation Transformer helps boost the accuracy, but at the cost of computational resource. Accordingly, when the Feature Relation Transformer model is not used, the hidden state vectors corresponding to the object queries and the track queries set from the Transformer Decoder model are compared based on the dot product operator, with output matrix $M_{sim}$. This matrix directly becomes the input to the Differentiable Matching Layer in later step. Third, the Feature Relation Transformer is directly connected to a Differentiable Matching Layer, which takes as input the similarity matrix $M_{sim}$. The target output is a soft assignment matrix $M_{ass} \in [0,1]^{(N_{tracks}+1) \times (N_{objs}+1)}$, where each row represents a track query, and each column represents an object query. We propose two choices for this layers: (1) dual-softmax or (2) Sinkhorn Iterative Normalization. For dual-softmax, the algorithm performs a softmax operation on the input matrix along the rows (then sum of each row equal to 1), and along the columns (sum of each column equal to 1), yielding two matrices $M_{row} \in [0,1]^{(N_{tracks}+1) \times (N_{objs}+1)}$ and $M_{col} \in [0,1]^{(N_{tracks}+1) \times (N_{objs}+1)}$. These two matrices are then element-wise multiplied with each other, yielding the output matrix as the predicted soft assignment matrix $M_{ass} = M_{row} \times M_{col} \in [0,1]^{(N_{tracks}+1) \times (N_{objs}+1)}$. Note that before performing the softmax operation along the rows or columns, the values in the input matrix are first divided by a temperature parameter $\tau$temperature<1 in order to sharpen the distribution after softmax layer. For Sinkhorn Iterative Normalization (also known as Optimal Transport layer), the algorithm takes as input a matrix, performs N iterations of normalization along the rows and columns ($N \geq 1$, typically chosen as $3 \leq N \leq 8$). When N is large enough, the output converges to a soft assignment matrix with the same dimensions as the input matrix. The Feature Relation Transformer and the Differentiable Matching Layer are trained using labeled data as the ground-truth assignment matrix (one-to-one mapping from tracking ground-truth), with the Focal loss function. The ground-truth assignment matrix $G_{ass}$ is a soft assignment matrix that is one-to-one mapped based on the multi-object tracking labels, satisfying: (i) i th track is linked to j th object if and only if $G_{ass}^{ij}=1$, $G_{ass}^{ik}=0 \forall k \neq j \forall G_{ass}^{kj} 0 \forall \neq i$ (each non-dustbin row or column will have a single element equal to 1 and all other elements equal to 0); (ii) tracks that do not correspond to any objects (i.e., disappeared or temporarily occluded objects) are matched with a dustbin object; (iii) objects that do not correspond to any tracks (i.e., the object appears for the first time) are matched with the dustbin track.

Prior methods typically solve the problem of multi-object tracking by splitting the object detection and object linking steps into two separate steps. Our approach discussed so far merges the two steps into a single deep learning model JDAT, simplifying the pipeline and complex handcrafted logic, while being able to be trained end-to-end. Note that the object detection model is based on DETR, which eliminates heuristic steps such as anchor analysis and NMS. Furthermore, the input of the JDAT model includes information about the tracking results of previous timestep, which is useful information to improve the accuracy of the object detection model, especially in cases of occlusion. The output of the JDAT model is a list of objects detected in the current timestep's frame, along with the soft assignment matrix $M_{ass}$ that serves for the subsequent object association step.

Figure 5:
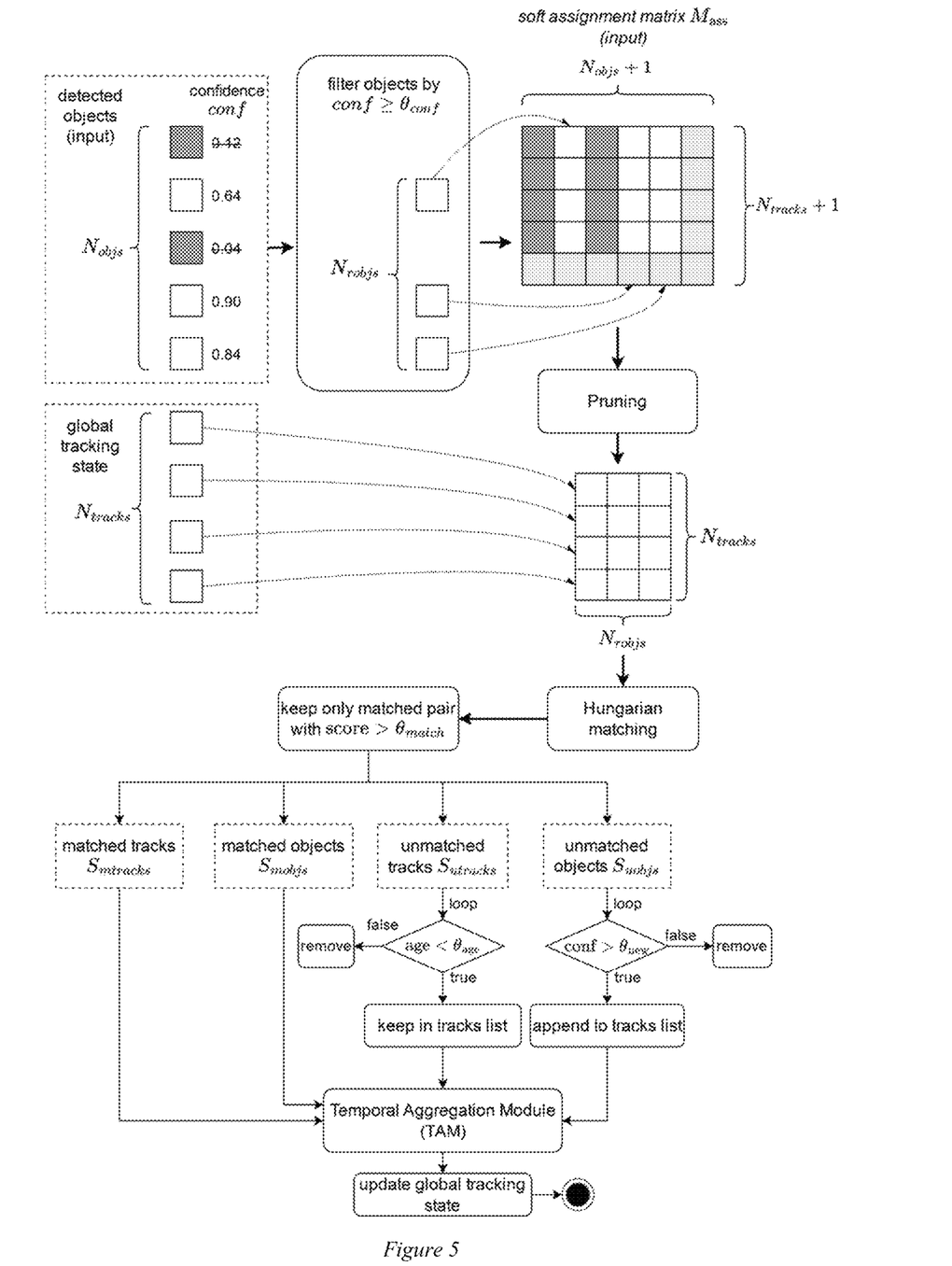
FIG. 5 describes the flow of the post-processing algorithm.

Step 3.2: Post-Processing and Update Tracking State;

We propose a simple thus effective post-processing module based on the object detection results and the soft assignment matrix $M_{ass}$ obtained from the output of the JDAT model, reference to FIG. 5. Specifically, objects with confidence less than $\theta_{det}$ are considered to be background and are removed. Accordingly, the soft assignment matrix is pruned by removing the two dustbin rows/columns (corresponding to the dustbin track and dustbin object) and also the columns corresponding to the removed (considered as background) objects. The tracks are linked to the remained detected objects, based on the soft assignment matrix, by simply using the threshold $\theta_{match}$ in combination with the nearest neighbor algorithm or the Hungarian algorithm (for bipartial graph matching). In case of the nearest neighbor algorithm, iterate over each i th row (corresponding to i th track), we find the object with the highest score on that row, corresponding to a j th column such that $$j = \underset{k}{\mathrm{argmax}} M_{ass}^{ik}$$

and if $M_{ass}^{ij} > \theta_{match}$, we considered (i th track, j th object) to be a matched pair, then assign the corresponding column $M^*{}_{ass}^{j} = -1$ to avoid multiple tracks (row) linking to the same object (column). In case of using the Hungarian bipartial graph matching algorithm, after finding the matched pairs, only the matched pairs with score>$\theta_{match}$ are considered to be valid. The tracks that are unmatched in $\theta_{age}$ consecutive frames are considered as lost tracks and thus be removed. Detected object that are unmatched to any track is considered to be a newborn track if its confidence is greater than a threshold $\theta_{new}$ ($\theta_{new} \geq \theta_{det}$). The tracking state and features are then re-calculated and updated. We note that the proposed algorithm does not use handcrafted motion models such as Kalman Filter, as well as cascade matching using IOU (Intersection Over Union) or object embedding distance. The feature such as motion or appearance of the object are all extracted and implicitly compared through the deep learning model JDAT mentioned in step 3.1, in an automatic and learnable manner, thus resulting in high accuracy and low latency.

Step 3.3: Update Tracking State Using a Temporal Aggregation Module (TAM).

Figure 6:
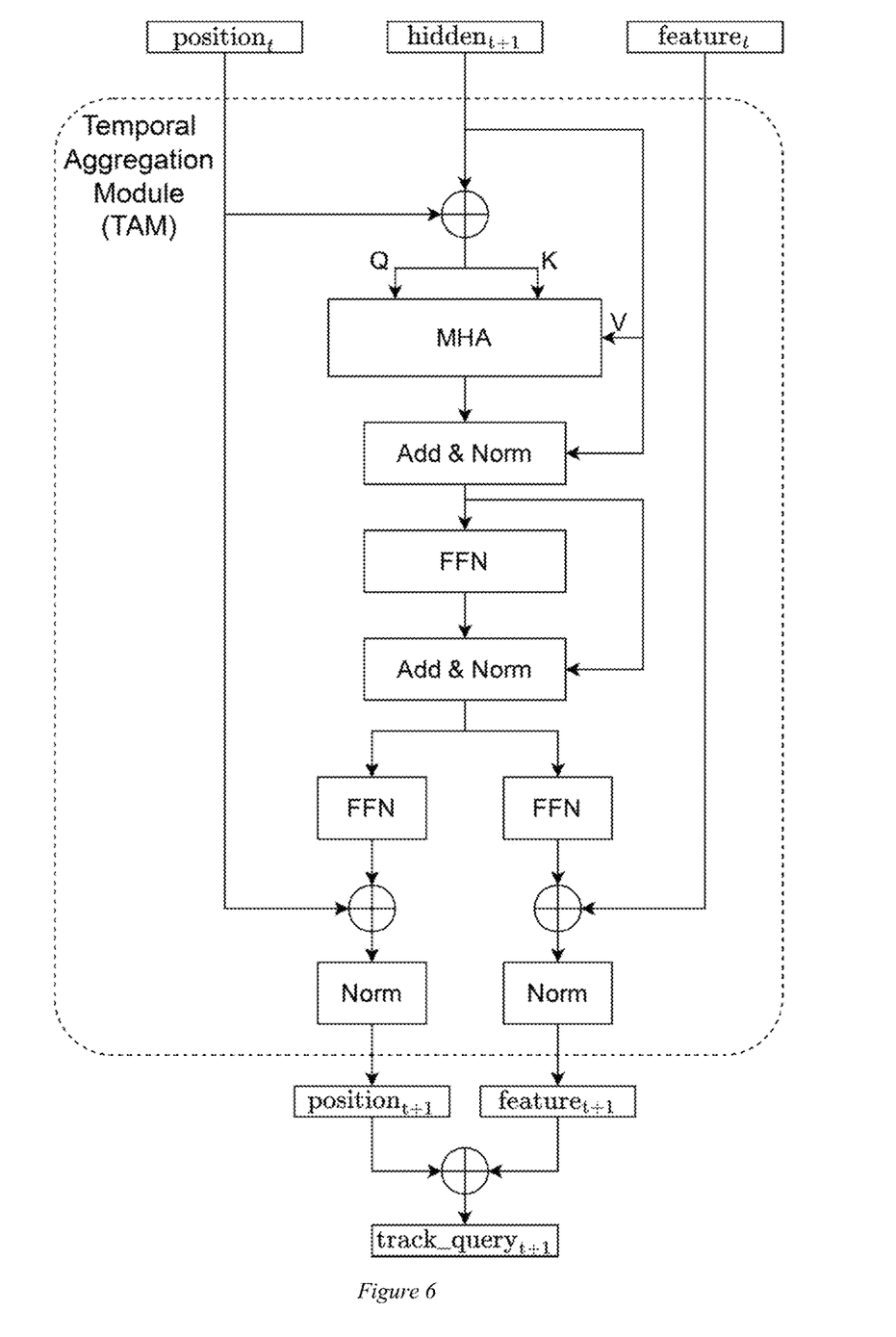
FIG. 6 describes the architecture design of Temporal Aggregation Module to update the tracking state across timesteps.

One problem to be solved is the need to update the information/state of the tracks over multiple timesteps. The modeling of the each track feature (embedding) should implicitly contain time-related features. For example, the appearance feature when occlusion occurs is noisy thus should be removed, and only keep the appearance feature before occlusion. After each timestep, the embedding of the track needs to be updated (e.g., position, velocity, etc.). To solve this, we propose a Temporal Aggregation Module (TAM), with the aim of updating each track's feature over time as soon as new observations are available, described in FIG. 6. TAM is a simple module consisting of a self-attention layer, combined with feed-forward layers (FFN). The input of this module is a sequence of vectors representing each valid track-object pair from step 3.2. Each track is represented by three vectors: (i) a vector position$_t$ encode location information of that track query; (ii) a vector feature$_t$ encode embedding (i.e, appearance information) of that track query; (iii) the hidden vector hidden$_t$ corresponding to the observation feature obtained from the Feature Relation Transformer model. Note that the three vectors all have the same size $D_2$. These vectors are then passed through the TAM model, the output is the location encoding vector position$_{t+1} \in R^{D_2}$ and the updated feature embedding vector feature$_{t+1} \in R^{D_2}$. The sum of these two vectors query$_{t+1}$=position$_{t+1}$+feature$_{t+1}$ acts as track query for the Transformer Decoder (mentioned in Step 3.1) in the next timestep.

Finally, we propose a training method for the mentioned deep learning models, which enable simultaneously end-to-end training with a loss function accumulated over timesteps (Collective Average Loss—CAL). In details, the loss function on each frame (corresponding to each timestep) is the weighted sum of the following loss terms: (i) object detection loss similar to Deformable DETR and (ii) soft assignment matrix loss is Focal loss on the output soft assignment matrix of the Differentiable Matching Layer. Note that, the track query needs to be updated iteratively over timesteps, the JDAT model is trained based on the tracking results on a sequence of Z consecutive frames (usually, Z=T). These loss values are accumulated across timesteps in a video, then be normalized to help stabilize the training process. The entire model is trained with supervised learning signal on video datasets with standard multi-object tracking label. However, video datasets with complete and accurate labels are still limited in both size and quality. Therefore, we propose to train the JDAT model using self-supervised learning with weak label, i.e. with object detection annotated images, for example, CrowdHuman, MS COCO, etc. Given the input is a single image, we use data augmentation methods such as: left/right translation, rotation, zoom in, zoom out, homorgraphy transformation, etc., to generate additional images from that original image, thereby obtaining pseudo generated motion video. This training method can be performed as a pre-training step before training with video data to boost the object detection and tracking performance.

Although the descriptions above contain many specific details, they are not to be considered as limited scope for our claims, but only for the purpose of illustrating some example embodiments.

The invention claimed is:

1. A method for multi-object tracking from video, comprising the steps of:
    Step 1: capturing frames from a streaming source and preprocess the data;
    a Camera Stream Capturing module capture consecutive frames from a data stream from the streaming source, samples the required frames, pre-processes them, concatenate nearby frames into cube of frames, then puts them into a Frames Cube Input Queue as input for the next step, the preprocessing step standardizes every stream to the same frame rate and resolution;
    Step 2: video feature extraction
    a feature extraction module takes a cube of adjacent frames as input to a deep learning model capable of extracting features in both space and time (spatial-temporal features) comprising three choices for deep learning feature extractor: (i) a 3D-CNN backbone followed by a Transformer Encoder (ii) a Video Transformer Encoder and (iii) a 2D-CNN encoder with a stack of frames as input followed by a Transformer Encoder;
    Step 3: multi-object tracking, post-processing and updating tracking state;
    a object tracking module performs object detection and association based on the input features of the frames of interest, combined with a current tracking state, this step includes three sub-steps as follows: (3.1) object detection and association using a multi-task end-to-end deep learning model, named JDAT (Joint Detection Association Transformer), composed of three key components: a Transformer Decoder model, a Feature Relation Transformer model and a Differentiable Matching Layer; (3.2) post-processing and update tracking state; (3.3) Update tracking state using a Temporal Aggregation Module (TAM),
    in which, the deep learning models in step 2 and step 3 are trained simultaneously end-to-end with a loss function that is accumulated over multiple timesteps (Collective Average Loss—CAL).

2. The method for tracking multiple objects from video of claim 1, wherein:
    in step 2, employing a different approach to extract features of a frame of interest, which combine information from nearby frames (both before or after) to enhance the extracted features of a target frame, specifically, the feature extraction module takes a cube of adjacent frames as input to a deep learning model with capable of extracting feature in both space and time (spatial-temporal feature), specifically, comprising three choices for deep learning feature extractor: (1) a 3D-CNN backbone followed by a Transformer encoder (2) a Video Transformer Encoder and (3) a 2D-CNN encoder with a stack of frames as input followed by a Transformer Encoder.

3. The method for tracking multiple objects from video of claim 2, wherein:

in step 2, for the two model choices of 3D-CNN or Video Transformer, the deep learning model takes input as a sequence of K frames sampled around a sequence of T frames of interest (K≥T, typically K is a multiplier of T), represented by a matrix $I \in R^{K \times H \times W \times C}$, the output of the model is the extracted feature of T frames of interest, represented by a matrix $F \in$ $$R^{T \times \frac{H}{R} \times \frac{W}{R} \times D}$$

(typically, K=32), in which the matrix $F_i \in$ $$R^{\frac{H}{R} \times \frac{W}{R} \times D}$$

is considered as the feature of the i th frame wherein this model's choice extract features of T frames in a single inference step (parallelism), instead of T inference steps as traditional methods using 2D-CNN over each frame.

4. The method for tracking multiple objects from video of claim 3, wherein:

in step 2, use 3D-CNNs models such a Temporal Shift Module (TSM), SlowFast, X3D, MoviNet, etc. for video feature extraction, use a Transformer encoder model immediately after the 3D-CNN to increase the ability to extract global features, resolve the weaknesses of CNN models thus improve accuracy in later step, the Transformer part contain N effective linear self-attention layers (e.g., 2≤N≤8), which slightly increases the computational cost but significantly improves the ability to extract global, context-aware interaction thanks to the Transformer's attention mechanism.

5. The method for tracking multiple objects from video of claim 3, wherein:

in step 2, for a Video Transformer model, use models such as Swin Transformer and MVIT (Multi-scale Vision Transformer) for video feature extraction, these models can effectively extract features in both space and time with global context thanks to Transformer architecture.

6. The method for tracking multiple objects from video of claim 2, wherein:

in step 2, for the choice of using 2D-CNN variants, extract feature of a single frame Y of interest, specifically, sample K frames around that frame Y of interest, stack the K frames along the channel dimension, obtaining a input matrix $I \in R^{H \times W \times (C \times K)}$, this matrix becomes the input for common 2D-CNN models such as Resnet, MobileNet, etc., for feature extraction, the output is a feature matrix $F \in$ $$R^{\frac{H}{R} \times \frac{W}{R} \times D}$$

considered as the feature of the frame Y, these feature matrix is then fed as input to a Transformer Encoder model to be enhanced with the global context information, this additional Transformer Encoder is effective when K is small (e.g. K≤3) without any change to the 2D-CNN architecture, also gaining benefit from various pre-trained models on large datasets, only select and extract feature of the frames of interest, and ensures that features of all frames of interest are extracted for the next processing step.

7. The method for tracking multiple objects from video of claim 1, wherein:

in step 3, step 3.1, the proposed model is Joint Detection Association Transformer (JDAT), which performs object detection and associates newly detected objects with a list of keeping tracks (track is a term of tracking state corresponding to a specific object instance, each track can be represented by that instance's properties such as: identifier, location, velocity, size, recognition features, etc.) and allows end-to-end training, this model is composed of three key components: (i) a Transformer Decoder model, (ii) a Feature Relation Transformer and (iii) a Differentiable Matching Layer.

8. The method for tracking multiple objects from video of claim 7, wherein:

the Transformer Decoder model is built based on the idea of DETR (Detection Transformer), an approach for object detection with the Transformer architecture, DETR's output is set-based, use parallel decoding mechanism instead of autoregressive decoding, the set of input queries is constructed as a union of two sets: (1) the object queries set inherits the idea from DETR, consisting of $N_{objs}$ vectors (typically, $N_{objs}$=100) and (2) the track queries set consists of $N_{tracks}$ vectors, each vector representing a track that is considered to be active at the current time, Denote $query_t^i$ is the i th query at t th timestep, is modeled as the sum of two vectors $query_t^i$=$feature_t^i$+$position_t^i$, where $position_t^i$ acts as positional encoding in Transformer model and is added to the query vector at start of each attention layer, all these vectors all have size $D_2$, so the queries set can be represented by a matrix $Q \in R^{(N_{objs}+N_{tracks}) \times D_2}$, use Deformable DETR as the Transformer Decoder architecture, $N_{objs}$ is set to a constant, but $N_{tracks}$ changes dynamically and depends on the previous timestep's tracking state, inherited from DETR, the object query vectors are learnable embeddings, the Transformer Decoder model are built on self-attention and cross-attention layers in where the queries self-interact with each other and cross-interact with the extracted frame feature map from step 1, allowing object queries to directly interact with track queries thus improve object detection accuracy in occlusion situations, tracking state in the previous timestep and current timestep contains useful information for object detection (referring track-to-detect approach), compared to other methods that mostly do not considering tracking state to improve object detection accuracy, the output of the Transformer Decoder model is a set of $N_{objs}$+$N_{tracks}$ hidden states with size $D_2$ corresponding to each input query, named the query hidden states, in which, the first $N_{objs}$ hidden states correspond to the $N_{objs}$ object queries, each vector in these $N_{objs}$ hidden states is then passed through a feed-forward neural network (FFN) to predict object's properties including center coordinate, width, height, class (e.g., person, bicycle, motorcycle, etc.), and confidence, the pipeline for detecting objects is identical to original DETR model, finally, $N_{objs}$ objects are filtered based on the confidence score to distinguish real objects from background, using a simple rule that real objects will have a high confidence that is greater than a threshold $\theta_{det}$, where objects with confidence score less than $\theta_{det}$ are considered to be background and be removed, the Transformer Decoder model is trained in a similar way to the Deformable DETR model in supervised manner, this model inherits the advantages of DETR such as: no need for post-processing algorithms such as NMS (Non-maximum Suppression) to filter out duplicated objects, effective learned global context reasoning thanks to the Transformer architecture, etc., at inference time, removing the NMS step significantly reduces the latency for the post-processing step, object queries can directly interact with track queries through the attention mechanism, thus enrich both kind of feature representations.

9. The method for tracking multiple objects from video of claim 7, wherein:
Feature Relation Transformer model is built based on self-attention and cross-attention layers, this model takes two sets of embedding vectors as input: (i) the set of hidden states of object queries $S_{objs}$ and (ii) the set of track queries's embeddings $S_{tracks}$ from the previous timestep, the target output is a soft assignment matrix where each row represents a track query, each column represents an object query, and the element at i th row, j th column is a probability score if the i th track i is associate to j th object, a row may not be associated with any columns (when a track corresponding to that row disappears), or a column may not be associated with any rows (when an object represented by that column appears for the first time), to address this issue, use the "dustbin" technique, which is a widely used technique in graph neural network literature, specifically, this technique involves adding a dustbin object (virtual object) to the $S_{objs}$ set and a dustbin track (virtual track) to the $S_{tracks}$ set, each dustbin object is represented by a learnable vector of size $D_2$, therefore, $|S_{objs}|=N_{objs}+1$ or $|S_{tracks}|=N_{tracks}+1$, next step, $S_{objs}$ and $S_{tracks}$ are passed through the Feature Relation-Transformer model, which includes self-attention layers to model interactions within each sets, and cross-attention layers to model interactions across the two sets, the output hidden states of the Transformer model corresponding to the two sets are represented by two matrices $H_{objs} \in R^{(N_{objs}+1) \times D_2}$ and $H_{tracks} \in R^{(N_{tracks}+1) \times D_2}$, the dot product of these two matrices represents the feature similarity between each pair of track query and object query, denotes as a matrix $M_{sim}=H_{tracks}H_{objs}^T \in R^{(N_{tracks}+1) \times (N_{objs}+1)}$, each row in $M_{sim}$ corresponds to a track, and each column corresponds to an object.

10. The method for tracking multiple objects from video of claim 7, wherein:
the Feature Relation Transformer model is optional, i.e. it can be included or ignored in the overall JDAT model, the Feature Relation Transformer helps boost the accuracy, but at the cost of computational resource, accordingly, when the Feature Relation Transformer model is not used, the hidden state vectors corresponding to the object queries and the track queries set from the Transformer Decoder model are compared based on the dot product operator, with output matrix $M_{sim}$, this matrix directly becomes the input to the Differentiable Matching Layer in later step.

11. The method for tracking multiple objects from video of claim 7, wherein:
a Differentiable Matching Layer is directly connected to the Feature Relation Transformer, which takes as input the similarity matrix $M_{sim}$, the target output is a soft assignment matrix $M_{ass} \in [0,1]^{(N_{tracks}+1) \times (N_{objs}+1)}$, where each row represents a track query, and each column represents an object query, comprising two choices for this layers: (1) dual-softmax or (2) Sinkhorn Iterative Normalization.

12. The method for tracking multiple objects from video of claim 11, wherein:
Dual-softmax is used as the Differentiable Matching Layer, the algorithm performs a softmax operation on the input matrix along the rows (then sum of each row equal to 1), and along the columns (sum of each column equal to 1), yielding two matrices $M_{row} \in [0,1]^{(N_{tracks}+1) \times (N_{objs}+1)}$ and $M_{col} \in [0,1]^{(N_{tracks}+1) \times (N_{objs}+1)}$, these two matrices are then element-wise multiplied with each other, yielding the output matrix as the predicted soft assignment matrix $M_{ass}=M_{row} \times M_{col} \in [0,1]^{(N_{tracks}+1) \times (N_{objs}+1)}$, before performing the softmax operation along the rows or columns, the values in the input matrix are first divided by a temperature parameter $\tau_{temperature}<1$ in order to sharpen the distribution after softmax layer.

13. The method for tracking multiple objects from video of claim 11, wherein:
Sinkhorn Iterative Normalization (also known as Optimal Transport layer) is used as the Differentiable Matching Layer, the algorithm takes as input a matrix, performs N iterations of normalization along the rows and columns ($N \geq 1$, typically chosen as $3 \leq N \leq 8$), when N is large enough, the output converges to a soft assignment matrix with the same dimensions as the input matrix.

14. The method for tracking multiple objects from video of claim 7, wherein:
the Feature Relation Transformer and the Differentiable Matching Layer are trained using labeled data as the ground-truth assignment matrix (one-to-one mapping from tracking ground-truth), with the Focal loss function, the ground-truth assignment matrix $G_{ass}$ is a soft assignment matrix that is one-to-one mapped based on the multi-object track labels, satisfying: (1) i th track is linked to j th object if and only if $G_{ass}^{ij}=1$, $G_{ass}^{ik}=0 \forall k \neq j \vee G_{ass}^{kj}=0 \forall k \neq i$ (each non-dustbin row or column will have a single element equal to 1 and all other elements equal to 0); (2) tracks that do not correspond to any objects (i.e., disappeared or temporarily occluded objects) are matched with a dustbin object; (3) objects that do not correspond to any tracks (i.e., the object appears for the first time) are matched with the dustbin track.

15. The method for tracking multiple objects from video of claim 1, wherein:
instep 3.2, using a simple thus effective post-processing module based on the object detection results and the soft assignment matrix $M_{ass}$ obtained from the output of the JDAT model, specifically, objects with confidence less than $\theta_{det}$ are considered to be background and are removed, accordingly, the soft assignment matrix is pruned by removing the two dustbin rows/columns (corresponding to the dustbin track and dustbin object) and also the columns corresponding to the removed (considered as background) objects, the tracks are linked to the remained detected objects, based on the soft assignment matrix, by simply using the threshold $\theta_{match}$ in combination with the nearest neighbor algorithm or the Hungarian algorithm (for bipartial graph matching), only the matched pairs with score>$\theta_{match}$ are considered to be valid, the tracks that are unmatched in $\theta_{age}$ consecutive frames are considered as lost tracks and thus be removed, detected object that are unmatched to any track is considered to be a newborn track if its confidence is greater than a threshold $\theta_{new}$ ($\theta_{new} \geq \theta_{det}$), the tracking state and features are then re-calculated and updated.

16. The method for tracking multiple objects from video of claim 15, wherein:

the post-processing module uses the nearest neighbor algorithm, iterate over each i th row (corresponding to i th track), we find the object with the highest score on that row, corresponding to a j th column such that $$j = \operatorname*{argmax}_{k} M_{ass}^{ik}$$

and if $M_{ass}^{ij} > \theta_{match}$, we considered (i th track, j th object) to be a matched pair, then assign the corresponding column $M^*{}_{ass}^{j} = -1$ to avoid multiple tracks (row) linking to the same object (column).

17. The method for tracking multiple objects from video of claim 15, wherein:

the post-processing module uses the Hungarian bipartial graph matching algorithm, after finding the matched pairs, only the matched pairs with score>$\theta_{match}$ are considered to be valid.

18. The method for tracking multiple objects from video of claim 1, wherein:

instep 3.3, we use the Temporal Aggregation Module (TAM), with the aim of updating each track's feature over time as soon as new observations are available, TAM is a simple module consisting of a self-attention layer, combined with feed-forward layers (FFN), the input of this module is a sequence of vectors representing each valid track-object pair from step 3.2, each track is represented by three vectors: (i) a vector position$_t$ encode location information of that track query; (ii) a vector feature$_t$ encode embedding (i.e, appearance information) of that track query; (iii) the hidden vector hidden$_t$ corresponding to the observation feature obtained from the Feature Relation Transformer model, the three vectors all have the same size $D_2$, these vectors are then passed through the TAM model, the output is the location encoding vector position$_{t+1} \in R^{D_2}$ and the updated feature embedding vector feature$_{t+1} \in R^{D_2}$, the sum of these two vectors query$_{t+1}$=position$_{t+1}$+feature$_{t+1}$ acts as track query for the Transformer Decoder (mentioned in Step 3.1) in the next timestep.

19. The method for tracking multiple objects from video of claim 1, wherein:

the deep learning modules defined in step 2 and step 3 are trained end-to-end simultaneously with a loss function accumulated over the time sequence (Collective Average Loss—CAL), the loss function on each frame (corresponding to each timestep) is the weighted sum of the following loss terms: (1) Object detection loss similar to Deformable DETR; (2) Soft assignment matrix loss is Focal loss on the output soft assignment matrix of the Differentiable Matching Layer.

20. The method for tracking multiple objects from video of claim 1, wherein:

the deep learning modules defined in step 2 and step 3 are trained end-to-end on weakly labeled image dataset in a self-supervised learning manner first, pre-training process use object detection annotated images, for example, CrowdHuman, MS COCO, etc., given the input is a single image, use data augmentation methods such as: left/right translation, rotation, zoom in, zoom out, homography transformation, etc., to generate additional images from that original image, thereby obtaining pseudo generated motion video, then, they are finetuned on supervised video datasets with full tracking labels.

\* \* \* \* \*